United States Patent [19]

Camerik

[11] 4,092,671
[45] May 30, 1978

[54] VIDEO PLAYER HAVING PLURAL SAFETY DEVICES ACTUATED BY UNLATCHING

[75] Inventor: Eduard Camerik, Eindhoven, Netherlands

[73] Assignee: U.S. Philips Corporation, New York, N.Y.

[21] Appl. No.: 786,603

[22] Filed: Apr. 11, 1977

Related U.S. Application Data

[63] Continuation-in-part of Ser. No. 628,092, Nov. 3, 1975, Pat. No. 4,032,971.

[30] Foreign Application Priority Data

Feb. 9, 1977 Netherlands .......................... 7701332

[51] Int. Cl.² ........................ H04N 5/76; G11B 17/00
[52] U.S. Cl. .................................... 358/128; 292/144
[58] Field of Search ........................ 358/128; 292/144

[56] References Cited

U.S. PATENT DOCUMENTS

| | | | |
|---|---|---|---|
| 3,930,653 | 1/1976 | Huff | 358/128 |
| 3,940,148 | 2/1976 | Torrington et al. | 358/128 |
| 3,954,272 | 5/1976 | Leedom | 358/128 |

Primary Examiner—John H. Wolff
Attorney, Agent, or Firm—Frank R. Trifari; Simon L. Cohen

[57] ABSTRACT

A video disc player comprises a cam body which is mounted on a cover, which cam body has a cam for latching the cover in a closed playing position and for actuating a main motor switch. The cam body carries an additional latching cam with the aid of which the cover is already latched when the cover is not yet fully closed, the playing position is not yet reached, and the main motor switch is not yet actuated.

1 Claim, 3 Drawing Figures

VIDEO PLAYER HAVING PLURAL SAFETY DEVICES ACTUATED BY UNLATCHING

This is a continuation-in-part application of U.S. application Ser. No. 628,092, filed Nov. 3, 1975, and now U.S. Pat. No. 4,032,971.

The invention relates to a video disc player for playing back optically readable video discs, comprising: a housing with a recess; a cover which is movable about a pivoting axis between a fully opened position and a fully closed playing position and which in the playing position covers a video disc which has been put on; latching means for latching the cover in its playing position, comprising a spring-loaded movably journalled catch, and a cam body which is secured to a side of the cover opposite the pivoting axis (front side), which cam body in the playing position extends into the said recess in the housing and is provided with a latching cam which cooperates with the catch in the playing position of the cover, and with a safety cam; unlatching means for releasing the cover from its latched position into an unlatched position from which the cover, without being impeded by latching means, can be moved into the fully opened position, which unlatching means comprise a manual actuating member, an unlatching member on which the catch is journalled which unlatching member is movable between an initial position and an unlatching position by means of the manual actuating member, as well as unlatching spring means for resiliently urging the cover from its playing position towards its unlatched position, the unlatching member being moved from its initial position to its unlatching position by actuation of the manual actuating member, so that the catch is moved relative to the cam body from the latching cam into a position in which the cover, without being impeded by the latching cam, can be opened by the unlatching spring means into a safety position which is situated between the latched position and the unlatched position, in which safety position the safety cam of the cam support is pressed against the catch by unlatching spring means, and owing to the unlatching member returning from its unlatching position to its initial position the catch being moved relative to the cam body into a position in which the cover, without being impeded by the safety can, can be opened further to its unlatched position by the unlatching spring means; a main motor; a drive spindle driven by the main motor for rotating a video disc is; an electric supply source for powering the main motor; a main motor switch for switching on and switching off the supply of an electric supply current to the main motor with the aid of the cam body, switching on being effected by a movement of the cover from its unlatched position to its playing position and switching off being effected by a movement of the cover from its playing position to its safety position; and a safety machanism which prevents the unlatching member from returning from its unlatching position to its initial position for a certain time interval which suffices to allow the speed of rotation of the drive spindle to be reduced to a non-hazardous safe value.

Such a video disc player has already been described in the applicant's U.S. Pat. No. 4,032,971. In this video disc player the cam body on the cover is profiled in such a way that when the cover is fully closed into its latched position, the main motor is switched on with the aid of the main motor switch. A problem is that in practice it is impossible to make the instant at which the catch has exactly reached the level on the latching cam for which the cover is latched and thus cannot be opened unless after actuation of the unlatching means exactly coincide with the instant at which the main motor is switched on. Therefore, this video disc player is constructed so that the main motor switch is actuated just before the catch latches the cover when this cover is being closed. However, as a result of this an incorrect operation of the video disc player is possible, which may lead to an unsafe situation. This is because a user may lower the cover so far that the main motor is already switched on but the cover is not yet latched, and subsequently opens the cover again. A video disc is generally driven with a speed which during playing is 1800 revolutions per minute (mains frequency 60 Hz) or 1500 revolutions per minute (mains frequency 50 Hz). In the applicant's previously described video disc player the video disc is braked by automatic braking means provided for this purpose if the cover is reopened. However, it is considered to be undesirable when braking is effected whilst the cover is open. An additional unsafe factor is then that when the cover is open the video disc is not pressed onto the drive spindle by a disc-loading means, as is the case when the cover is closed, but lies freely on the drive spindle. When the drive spindle is braked abruptly by the automatic braking means it is not unlikely that the video disc, which may still rotate rapidly, is flung off the drive spindle. Also in video disc players which are not provided with an automatic braking means, however, the high speed may give rise to the video disc being flung off the drive spindle.

It is an object of the invention to provide a video disc player of the type mentioned in the preamble with a greater safety of operation and which in particular prevents the cover from being reopened immediately after the main motor has been switched on, and the invention is characterized in that the cam body is provided with an additional latching cam which, if the said unlatching member is in its initial position, co-operates with the catch if the cover is in an intermediate position situated between the unlatched position and the playing position, in which intermediate position the application of supply current to the main motor has not yet been switched on by the cam body and the cam body is furthermore provided with an additional safety cam which when the catch is situated on the additional latching cam prevents the movement of the unlatching member from its initial position to its unlatching position by co-pending with the catch, so as to prevent the cover from being opened completely when the cover has not yet reached its playing position, but in the meantime has assumed a position in which the supply current is already applied to the main motor.

The invention will now be described in more detail with reference to the drawing, in which.

Figure 1:
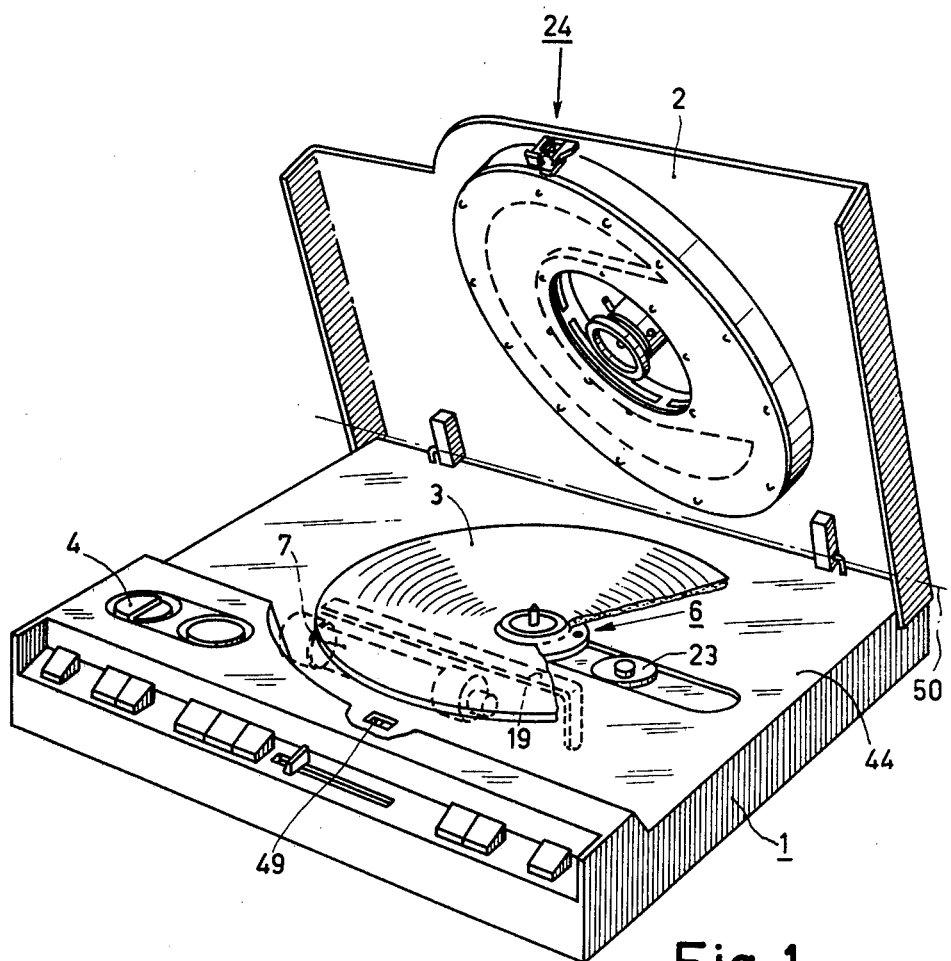
FIG. 1 is a perspective view of a video disc player with opened cover.
Figure 2:
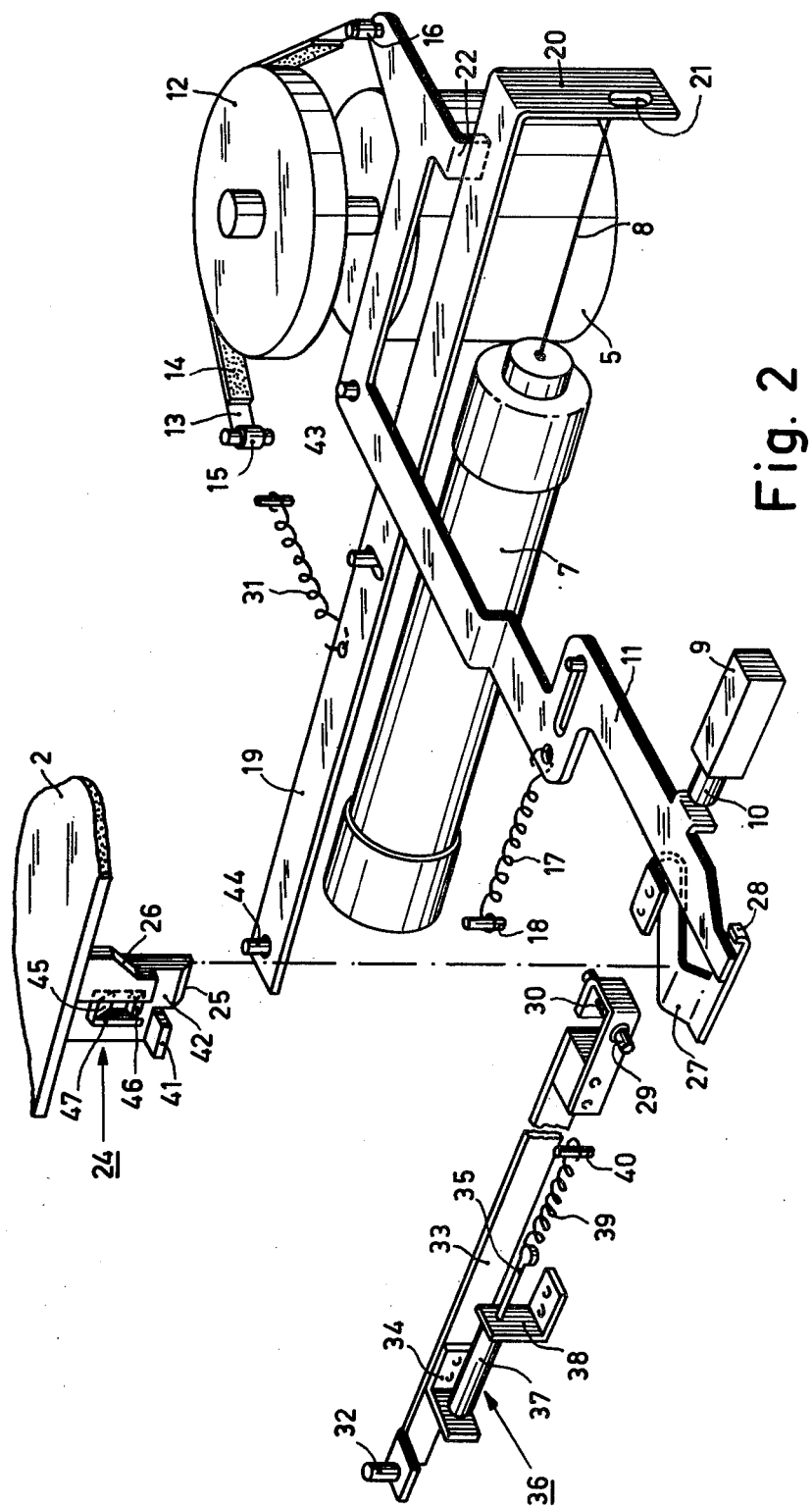
FIG. 2 is a perspective view of a number of parts of the video disc player of FIG. 1, including a cam body which is connected to the cover of the player and latching, unlatching and safety means co-operating therewith.

The video disc player shown in FIG. 1 is of the type in which optical information on a video disc is read by reflection with the aid of a laser beam. The player comprises a housing 1 on which a cover 2 is mounted which is hingeable about a pivoting axis 50. On the player a video disc 3 is placed which during playing is covered by the cover 2. In this playing position the cover is latched by latching means to be discussed hereinafter, unlatching being possible by means of a manual actuating member consisting of an unlatching button 4, and by means of a number of unlatching means also to be discussed hereinafter. In the housing a motor 5 is mounted, see FIG. 2, for rotating the video disc. This motor, herinafter to be referred to as main motor, is coupled with a drive spindle 6 for the rotary support of the video disc which has been put on. Furthermore, the housing 1 accommodates a radiation source in the form of a laser 7, which is schematically shown in FIGS. 1 and 2 and which may for example consist of a helium-neon laser. In FIG. 2 the beam of radiation produced by the laser is designated 8.

During unlatching the unlatching means yet to be discussed co-operate with a number of safety means (see FIG. 2). Said safety means comprise:

a. Switching means in the form of a switch 9, provided with a plurality of switching contacts, not shown, for switching on and off a power supply source, not shown, for the main motor 5. In FIG. 2 the electrical connections between an electric power supply source and the switch 9 and the main motor 5 are neither shown for the sake of clarity. By the actuation of the switch 9, which is provided with a push-button 10, the power supply to the main motor is switched on or off.

b. Automatic braking means for braking and stopping the drive spindle 6. In the embodiment of FIG. 2 these means comprise a brake lever 11 which is pivotably connected to the housing, a brake disc 12 on the drive spindle, as well as a brake band 13, which is provided with a brake lining 14 and which at one of its ends 15 is connected to the housing and with its other end 16 to the brake lever 11. As will appear subsequently when the operation of the various safety means is described the brake band 13 co-operates with a part of the circumference of the brake disc 12 when the cover is open, but leaves said disc completely free in the playing position. The braking means also include a tension spring 17, which at one side is connected to the brake lever 11 and at the other side is rigidly connected to the housing via a pin 18. This spring urges the brake lever continuously in a direction towards the braking position.

c. Switching means for extinguishing the radiation source, also comprising at least one switching contact on the switch 9. The electrical connections to the laser are neither shown.

d. Shielding means which enter into the radiation path of the radiation beam 8 for shielding said radiation beam before it can emerge from the housing 1. In the embodiment of FIG. 2 these shielding means comprise a shielding lever 19 which is hingeably connected to the housing and a vane 20 which is connected thereto, which vane is situated in the radiation path of the radiation beam 8 in the shielding position of the shielding lever 19 and masks said beam, if present, but in the playing position of the cover allows this beam to pass freely through an opening 21 formed in the vane. Furthermore, the shielding means include a tension spring 31 which continuously urges the shielding lever 19 in a direction towards the bent tab 22 of the brake lever 11. Thus, the brake lever 11 and the shielding lever 19 are continuously in contact with each other and cooperate with each other, only the brake lever 11 co-operating with the cover 2 of the video disc player in a manner yet to be discussed.

The video disc player of FIG. 1 is provided with directing means 23 for directing a read beam at the information tracks of the video disc 3. These directing means comprise an objective which belongs to a focussing device, which objective is provided with a number of optical elements for focussing the light beam onto the information track and with means for receiving the reflected light beam. A suitable focussing device is for example described in the applicant's previous U.S. Pat. No. 4,021,101. This focussing device is mounted on a carriage underneath the deck 44 of the video disc player, which carriage is radially movable relative to the drive spindle. This carriage is not shown in the drawing and can be driven in its direction of movement by means of an electric auxiliary motor, not shown. In order to prevent the video disc player from being damaged during removal of a video disc further safety means are provided, viz:

e. Interrupting means, comprising at least one switching contact on the switch 9, for preventing an electric current from being applied to the said auxiliary motor, Furthermore, for preventing the focussing device and in particular the objective from being damaged, there are provided:

f. Interrupting means, also comprising at least one switching contact on the switch 9, for preventing an electric current from being applied to the objective motor.

Both the auxiliary motor of the carriage and the objective motor are motors which are energized via a servo system. Consequently, they are included in a control circuit. The auxiliary motor is included in a control circuit for the radial tracking of the spiral track on a video disc and the objective motor in a control circuit for following the axial movements of the disc with the objective. When the video disc is removed this results in the said control circuits continuously receiving an error signal, as a result of which the auxiliary motor will move the carriage into one of its extreme positions, whilst the objective motor will set the objective to its highest oosition. Thus, the objective may be damaged for example by manipulations with the next disc to be put on, whilst it is also undesirable that the carriage is continuously kept in the extreme position, because the motor would then constantly receive a voltage of maximum value in the stationary condition.

The latching and unlatching means will now be discussed hereinafter.

The latching means comprise a cam body 24 which is connected to the cover 2. Said cam body has a fairly complicated shape and is most clearly visible in FIGS. 2 and 3. It has a free bevelled end 25 and a partly oblique side face 26 which co-operates with the brake lever 11 and carries a latching cam 45, a safety cam 41, an additional latching cam 46 and an additional safety cam 47. In the playing position of the cover the brake lever 11 is pressed against the side face 26 under the influence of the tension spring 17 and is thus kept of out of the braking position. In this position of the cover the cam body projects into a recess 49 in the housing and the free end 25 co-operates with a leaf spring 27. This spring is connected to the housing 1 and continuously bears against the free end 25 in the playing position. Also connected to the leaf spring 27 is a hook-shaped member 28. When the cover is open, i.e., in the situation shown in FIG. 2, the hook-shaped member 28 blocks the brake lever 11. The latching means furthermore comprise a catch in the form of a pin 29 which, against the force of a pressure spring 30, can be moved in its longitudinal direction, i.e., axially.

The unlatching means comprise the said unlatching button 4 which can manually be moved to the left by the user, in order to unlatch the cover 2. The button 4 co-operates with a pin 32 which is mounted on an unlatching slide 33 which also carries the said pin 29.

On the unlatching slide a bracket 34 is fixed, to which a tension spring 39 is attached which with its other end is connected to a pin 40 on the housing 1 and which continuously loads the bracket 34. The unlatching slide 33 is thus continuously pulled to the right in FIG. 2 by the tension spring 39. During unlatching the force of this spring must consequently be overcome by means of the button 4.

Figure 3:
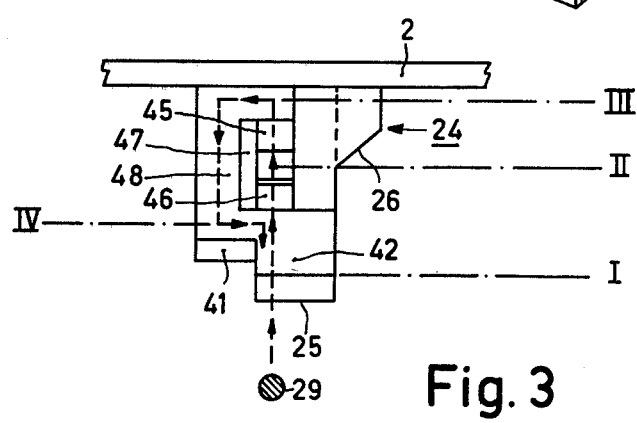
FIG. 3 is an elevation of the cam body and, in cross-section, a catch.

At the instant that the cover 2 is closed the various co-operating parts are in a position as shown in FIG. 2. At a given instant during the downward movement of the cover 2 the end 25 of the cam body 24 comes into contact with the leaf spring 27. The cover is now in what will be referred to as its "unlatched position." In this position the end of the catch 29 which faces the cam body 24 is situated on a flat portion 42 of the cam body. In FIG. 3 the path which is followed by the end of the catch over the cam body when the cover 2 is moved from its unlatched position to its latched position and is subsequently unlatched again is indicated by means of a dashed line and arrows. In the unlatched position of the cover the end of the catch is in a position relative to the cam body which in FIG. 3 is designated I. By further closing the cover against the force of the leaf spring 27, the catch 29 is moved over the additional cam 46 into an intermediate position II. Once arrived in this position the cover can no longer be opened, not even by the actuation of the unlatching button 4, because the additional safety cam 47 in conjunction with the catch 29 prevents the latching slide 33 from being moved to the left.

Owing to the downward movement of the leaf spring 27, the hook-shaped member 28 has been moved downwards and can no longer prevent the brake lever 11 from being rotated. This happens by pressing the cover downwards from its intermediate position II into its latched position III against the latching of the leaf spring 27. The catch then moves over the cam body 24 to a position above the latching cam 45. Moreover, the oblique portion of the side face 26 moves the brake lever 11, so that the brake band 14 is disengaged from the brake disc 12 and the main motor is switched on by the main switch 9. Moreover, servo-circuits for the previously mentioned auxiliary motor and objective motor are switched on, the shielding lever 19 is actuated and the laser 7 is ignited. A hazardous manipulation with the cover and at the same time with the manual actuating member 4 is excluded because the additional latching cam 46 and the additional safety cam 47 prevent the catch from following a path relative to the cam body other than that indicated in FIG. 3 by 51. Hence, the cover can be unlatched only after complete latching.

The cover is released from the latched position III by manually moving the button 4 to the left. As a result the unlatching slide 33 is also moved to the left, so that the end of the catch 29 slides off the top of the latching cam 45 and comes on a flat portion 48. The leaf spring 27 presses the cover 2 upwards. However, the safety cam 41 now prevents the cover 2 from being opened further, because in the left-hand position of the unlatching slide 33 the catch 29 butts against the cam 41. The cover is now in its safety position (IV, FIG. 3). A safety mechanism comprises a plunger 35 which is connected to the bracket 34 and forms part of a grease damper 36, comprising a housing 37 containing grease, the plunger 35 and a fixing bracket 38. The grease damper 36 prevents the unlatching slide 33, from being moved to the right, unless after a certain time has elapsed. Only when the unlatching slide 33 has been slid back completely to the right can the cover 2 be opened fully again. The initial displacement of the cover 2 immediately after the actuation of the unlatching button 4, which initial displacement is equal to the distance between the top faces of the cams 45 and 41, is sufficient to ensure that the brake lever 11 no longer co-operates with the side face 26 of the unlatching hook 24. Thus, immediately after the actuation of the unlatching button 4 the tension spring 17 can rotate the brake lever about its hinge pin 43. Owing to this rotation the end 16 of the brake band 13 is moved over such a distance that the brake lining 14 comes into contact with the brake disc 12. However, during the movement of the brake lever 11, the button 10 of the switch 9 has also been moved outwards, so that the switching contacts on the switch 9 have already changed over. The main motor 5 is thus switched off, whilst the laser beam 8 has been extinguished and the auxiliary motor of the slide as well as the objective motor of the focussing device have been switched off. As an additional safety measure to prevent laser beam from emerging from the objective in the absence of a video disc whilst the cover is open, the tab 22 moreover rotates the shielding lever 19 about its hinge pin 44 when the brake lever 11 is rotated, so that a closed portion of the vane 20 enters into the path of the laser beam 8.

What is claimed is:

1. A video disc player for playing back optically readable video discs (3), comprising:

a housing (1) with a recess (49), a cover (2) which is movable about a pivoting axis (50) between a fully opened position and a fully closed playing position (III) and which in the playing position covers a video disc which has been put on, latching means for latching the cover in its playing position (III), comprising a spring-loaded movably journalled catch (29), and a cam body (24) which is secured to a side (front side) of the cover (2) opposite the pivoting axis (50), which cam body in the playing position extends into the said recess (49) in the housing (1) and is provided with a latching cam (45), which co-operates with the catch (29) in the playing position of the cover and with a safety cam (41), unlatching means for releasing the cover (2) from its latched position (III) into an unlatched position (I) from which the cover, without being impeded by latching means, can be moved into the fully opened position, which unlatching means comprise a manual actuating member (4) an unlatching member (33) on which the catch (29) is journalled which unlatching member is movable between an initial position and an unlatching position by means of the manual actuating member, as well as unlatching spring means (27) for resiliently urging the cover (2) from its playing position (III) towards its unlatched position (I), the unlatching member (33) being moved from its initial position to its unlatching position by actuation of the manual actuating member (4), so that the catch (29) is moved relative to the cam body (24) from the latching cam (45) into a position in which the cover (2), without being impeded by the latching cam, can be opened by the unlatching spring means (27) into a safety position (IV) which is situated between the latched position (III) and the unlatched position (I), in which safety position the safety cam (41) of the cam support is pressed against the catch (29) by the unlatching spring means (27), and owing to the unlatching member (33) returning from its unlatching position to its initial position the catch (29) being moved relative to the cam body (24) into a position in which the cover (2), without being impeded by the safety cam (41), can be opened further by the unlatching spring means (27) into its unlatched position (I), a main motor (5), a drive spindle (6) driven by the main motor for rotating a video disc (3), an electric supply source for powering the main motor (5), a main motor switch (9) for switching on and switching off the supply of an electric supply current to the main motor (5) with the aid of the cam body (24), switching on being effected by a movement of the cover (2) from its unlatched position (I) to its playing position (III) and switching off being effected by the movement of the cover (2) from its playing position (III) to its safety position (IV), and a safety mechanism (36) which prevents the unlatching member (33) from returning from its unlatching position to its initial position for a certain time interval which is sufficient to allow the speed of rotation of the drive spindle to be reduced to a non-hazardous safe value, characterized in that the cam body (24) is provided with an additional latching cam (46) which, if the said unlatching member (33) is in its initial position, cooperates with the catch (29) if the cover (2) is in an intermediate position (II) situated between the unlatched position (I) and the playing position (III), in which intermediate position the application of supply current to the main motor (5) has not yet been switched on by the cam body (24), and the cam body (24) is furthermore provided with an additional safety cam (47) which when the catch (29) is situated on the additional latching cam (46) prevents the unlatching member (33) from being moved from its initial position to its unlatching position by co-operation with the catch (29), so as to prevent the cover (2) from being opened completely when the cover has not yet reached its playing position (III) but in the meantime has assumed a position in which the supply current is already applied to the main motor (5).

* * * * *